United States Patent
Adil et al.

(10) Patent No.: US 11,685,257 B2
(45) Date of Patent: Jun. 27, 2023

(54) TRANSMISSION ARRANGEMENT AND METHOD FOR ASSEMBLING SAID TRANSMISSION ARRANGEMENT

(71) Applicant: Ningbo Geely Automobile Research & Development Co., Ltd., Ningbo (CN)

(72) Inventors: Shabbir Adil, Hisings Backa (SE); Rafael Ferreira, Gothenburg (SE)

(73) Assignee: NINGBO GEELY AUTOMOBILE RESEARCH & DEVELOPMENT CO., Ningbo (CN)

(*) Notice: Subject to any disclaimer, the term of this patent is extended or adjusted under 35 U.S.C. 154(b) by 33 days.

(21) Appl. No.: 17/479,960

(22) Filed: Sep. 20, 2021

(65) Prior Publication Data
US 2022/0001743 A1 Jan. 6, 2022

Related U.S. Application Data

(63) Continuation of application No. PCT/CN2020/079975, filed on Mar. 18, 2020.

(30) Foreign Application Priority Data

Apr. 8, 2019 (EP) .................................. 19167885

(51) Int. Cl.
*F16D 1/116* (2006.01)
*B60K 17/08* (2006.01)
(Continued)

(52) U.S. Cl.
CPC .............. *B60K 17/08* (2013.01); *F16D 1/116* (2013.01); *F16H 3/66* (2013.01);
(Continued)

(58) Field of Classification Search
CPC .............. F16H 3/66; F16H 2200/2007; F16H 2200/2064; F16H 2200/2094;
(Continued)

(56) References Cited

U.S. PATENT DOCUMENTS

| 8,220,365 B2* | 7/2012 | Yang ...................... B25B 17/02 81/55 |
| 2006/0205560 A1* | 9/2006 | Meier ..................... F16H 55/17 475/331 |
| 2008/0171630 A1 | 7/2008 | Madge | |

FOREIGN PATENT DOCUMENTS

| CN | 1367330 A | 9/2002 |
| CN | 103569192 A | 2/2014 |

(Continued)

OTHER PUBLICATIONS

International Search Report from corresponding International Application No. PCT/CN2020/079975, dated Jun. 19, 2020, 2 pages.

*Primary Examiner* — Roger L Pang
(74) *Attorney, Agent, or Firm* — Tucker Ellis LLP (57) ABSTRACT

A transmission arrangement for a vehicle includes an axial direction and a radial direction, a rotatable gear wheel having radially outer teeth for meshing engagement with a further gear member, and axially protruding engagement members, a first annular transmission member arranged next to the gear wheel and having corresponding axially protruding engagement members in torque transmission engagement with the engagement members of the gear wheel, and an annular groove provided in a radially facing surface, a second annular transmission member in torque transmission engagement with the first annular transmission member and having an annular groove provided in a radially facing surface and arranged radially overlapping with the annular groove of the first annular transmission member such that said annular grooves jointly define an annular space, and a locking member located within said annular space for axial locking of the first and second annular transmission members relative to each other.

16 Claims, 8 Drawing Sheets

(51) Int. Cl.
*F16H 3/66* (2006.01)
*F16D 1/10* (2006.01)
*F16H 57/00* (2012.01)

(52) U.S. Cl.
CPC .................. *F16D 2001/103* (2013.01); *F16H 2057/0056* (2013.01); *F16H 2200/2007* (2013.01); *F16H 2200/2064* (2013.01); *F16H 2200/2094* (2013.01)

(58) Field of Classification Search
CPC ........... F16H 2057/0056; F16H 57/023; F16H 2057/0235; B60K 17/046; F16D 1/116; F16D 2001/103; F16D 1/104
USPC ......................................................... 475/331
See application file for complete search history.

(56) References Cited

FOREIGN PATENT DOCUMENTS

| | | | |
|---|---|---|---|
| CN | 106286785 A | 1/2017 | |
| CN | 109027198 A | 12/2018 | |
| CN | 109923336 A | 6/2019 | |
| DE | 102016220702 A1 | 4/2018 | |
| DE | 102017112334 A1 | 12/2018 | |
| DE | 102017214658 A1 | 2/2019 | |
| DE | 102018102499 B3 * | 4/2019 | ........... F16H 57/082 |
| DE | 102021104113 A1 * | 8/2022 | |
| JP | 0932890 A | 2/1997 | |

* cited by examiner

TRANSMISSION ARRANGEMENT AND METHOD FOR ASSEMBLING SAID TRANSMISSION ARRANGEMENT

RELATED APPLICATION DATA

This application is a continuation of International Patent Application No. PCT/CN2020/079975, filed Mar. 18, 2020, which claims the benefit of European Patent Application No. 19167885.3, filed Apr. 8, 2019, the disclosures of which are incorporated herein by reference in their entireties.

TECHNICAL FIELD

The disclosure relates to transmission arrangement for a vehicle and a method for assembling a transmission arrangement for a vehicle. The transmission arrangement according to the disclosure can for example be arranged in a combustion engine powered, hybrid electric powered and pure electrical powered vehicle, such as a car.

Although the disclosure is described in relation to a front wheel driven car, the disclosure is not restricted to a transmission arrangement for this particular type of vehicle, but may alternatively be implemented in transmission arrangements having other types of drivetrain layouts, such as rear wheel drive, all-wheel drive, etc., and for other type of vehicles such as off-road vehicles, trucks, buses, marine vessels, working machines such as excavators, wheel loaders and the like, snowmobiles, motorcycles, etc.

BACKGROUND

A vehicle transmission typically provides variable ratio torque transmission from a power source, such as a combustion engine and/or an electric motor, to a driveshaft that is drivingly connected to a wheel of the vehicle.

In the field of vehicle transmissions, there is a continuous demand for improved compactness, robustness and reduced weight. However, integration of various sub-components into larger and more complex components may result in increased overall cost due to complex manufacturing and restriction in terms of selection of material.

Consequently, there is a demand for a further improved transmission arrangement, in particular with respect to compact, robust and lightweight design, while enabling a design comprising multiple sub-components assembled together.

SUMMARY

This section provides a general summary of the disclosure, and is not a comprehensive disclosure of its full scope or all of its features.

An object of the present disclosure is to provide an improved transmission arrangement with respect to compact, robust and lightweight design, while enabling a design comprising multiple sub-components assembled together.

This and other objects are at least partly achieved by a transmission arrangements and method for assembling a transmission arrangement, as defined in the accompanying independent claims.

In particular, according to a first aspect of the present disclosure, the objective is at least partly achieved by a transmission arrangement for a vehicle, wherein the transmission arrangement has an axial direction and a radial direction and comprises a rotatable gear wheel having radially outer teeth configured for meshing engagement with a further gear member, and axially protruding engagement members, a first annular transmission member arranged next to the gear wheel and having corresponding axially protruding engagement members in torque transmission engagement with the engagement members of the gear wheel, and an annular groove provided in a radially facing surface, a second annular transmission member being in torque transmission engagement with the first annular transmission member and having an annular groove provided in a radially facing surface and arranged radially overlapping with the annular groove of the first annular transmission member such that said annular grooves jointly define an annular space, and a locking member located within said annular space for axial locking of the first and second annular transmission members relative to each other.

Moreover, according to a second aspect of the present disclosure, the objective is also at least partly achieved by a method for assembling a transmission arrangement for a vehicle, which method comprises assembling first and second transmission members in torque transmission engagement with one another and arranging an annular groove provided in a radially facing surface of the first annular transmission member radially overlapping with an annular groove provided in a radially facing surface of the second annular transmission member, such that said annular grooves jointly define an annular space. The method further comprises inserting a free end of a locking member into an opening or recess of the first or second annular transmission members, and subsequently performing a relative rotation between the locking member and the first and second annular transmission members for sliding insertion of the locking member into the annular space, such as to axially lock the first annular transmission member to the second annular transmission member. The method still further comprises assembling the first annular transmission member with a rotatable gear wheel by axial relative displacement between the first annular transmission members and the gear wheel, such that axially protruding engagement members of the gear wheel becomes engaged with corresponding axially protruding engagement members of the first annular transmission member.

In this way, a strong, compact and lightweight torque connection between three individual components of the transmission is accomplished. More in detail, the torque connection between the rotatable gear wheel and the first annular transmission member by means of axially protruding engagement members interacting with corresponding axially protruding engagement members provides a very robust and strong torque connection that also enables a strong and robust design of the gear wheel and first annular transmission member. For example, a splined torque connection between radially overlapping relatively weak sleeve portions of the rotatable gear wheel and the first annular transmission member can be avoided.

Furthermore, by locating the axial locking member in an annular space defined by said annular grooves of the first and second annular transmission member radially facing each other provides a very compact locking of the first and second annular transmission member in both axial directions by means of a single locking member, thereby saving space compared to for example axial locking by means of two snap-rings, each located in groove of the first or the second transmission member and each inhibiting relative axial motion in one direction only.

Further advantages are achieved by implementing one or several of the features of the dependent claims.

In one example embodiment, an opening or recess is provided in the first or second annular transmission member for enabling access to said annular space. Thereby, good access to the annular space is provided for enabling insertion of the locking member after the annular grooves of the first and second annular transmission member have been position facing each other.

In a further example embodiment, the first annular transmission member has axially extending splines in torque transmission engagement with corresponding axially extending splines of the second annular transmission member. Thereby it is ensured that the locking member only has to interlock the first and second transmission members axially, and not rotationally, because the splines provide the necessary rotational locking.

In still a further example embodiment, the axially protruding engagement members are dog teeth, and the corresponding axially protruding engagement members are corresponding dog teeth. Dog teeth provide a very strong, robust and space-saving rotational connection.

In another example embodiment, the annular groove of the first annular transmission member is provided in a radially outward facing surface, and the annular groove of the second annular transmission member is provided in a radially inward facing surface. This layout is beneficial from a packing aspect because the annular groove of the first transmission member may then be located radially overlapping with interior gear teeth in implementation where the first transmission member is gear wheel, such as a ring gear of a planetary transmission, thereby enabling a very compact design of the first transmission member.

In still another example embodiment, the annular groove of the first annular transmission member is provided in a radially inward facing surface, and the annular groove of the second annular transmission member is provided in a radially outward facing surface. This layout may for example be advantageous in implementations where there is little or no space available radially outside of the first transmission member, because the second transmission member is here located radially inside of the first transmission member.

In yet another example embodiment, the first or second annular transmission member has a conical surface associated with said opening or recess and converging towards the annular space for enabling simplified insertion of the locking member into the annular space. Thereby, assembly of the transmission arrangement is simplified and more cost-efficient.

In a further example embodiment, the locking member has an annular or arc-shaped form in a natural state. Thereby, insertion of the locking member into the annular space is simplified, because the locking member may require less deformation during the insertion phase.

In another example embodiment, the locking member is configured to be inserted into the annular space by first orienting a free end of the locking member tangentially with the annular space in a region of the recess or opening and inserting the free end of the locking member into an access opening of the annular space, and subsequently performing a relative rotation between the locking member and the first and second annular transmission members for sliding insertion of the locking member into the annular space. Thereby, insertion of the locking member into the annular space is simplified, because the locking member may require less deformation during the insertion phase.

In a further example embodiment, the locking member is free from radially extending gripping portions. Thereby, the locking member is more easily inserted into the annular space, and the risk for undesirable interference during the locking member insertion phase is avoided.

In one example embodiment, the first and second annular transmission members are arranged at least partially radially overlapping, such that one of the first and second annular transmission members is located outside the other of the first and second annular transmission members, and wherein the opening or recess is located in the radially outer transmission member of said first and second annular transmission members, and wherein said radially outer transmission member has a recess in an axial end surface thereof, which recess extends from said axial end surface to a remote axial side of the annular groove of the outer transmission member, as seen in the axial direction, such as to provide access to the annular space. Such a recess in the axial end surface of the outer transmission member is relatively easily accomplished and it thus provide a simple and cost-efficient approach for gaining the necessary access to the annular space.

In still another example embodiment, the first and second annular transmission members are arranged at least partially radially overlapping, such that one of the first and second annular transmission members is located outside the other of the first and second annular transmission members, and wherein the opening or recess is located in the radially outer transmission member of said first and second annular transmission members, and wherein said radially outer transmission member has an opening extending through the outer transmission member in the radial direction and exiting within the annular groove of the outer transmission member, such as to provide access to the annular space. In implementations where the annular groove of the outer transmission member is located further away from the axial end surface, it may be undesirable to have a recess stretching a long distance in the axial direction. Hence, in such situations, it may be beneficial to provide an opening in the outer transmission member instead, which opening is offset from the axial end surface and radially overlapping with the annular groove of the outer transmission member. Thereby, access the annular space is accomplished.

In one example embodiment, an axial tolerance between the locking member and each of the annular groove of the first and second annular transmission members is in the range of 0.01-5 mm, specifically 0.05-1 mm, and more specifically 0.1-0.5 mm. Thereby, a proper relative positioning of the first and second transmission members is accomplished.

In one example embodiment, the second annular transmission member has a sleeve portion partly radially overlapping the first annular transmission member, and the annular groove of the second annular transmission member is provided in a radially facing surface of the sleeve portion. A sleeve portion with reduced material thickness compared with a main body of the second transmission member may be provided for ensuring a more compact design of the transmission arrangement.

In still one example embodiment, the transmission arrangement comprises a first planetary gear set arranged side-by-side with and having common rotational axis as the gear wheel, and the first annular transmission member is a ring gear of the first planetary gear set. This layout becomes specifically strong and compact.

In yet another example embodiment, the transmission arrangement comprises a second planetary gear set arranged side-by-side with and having common rotational axis as the first planetary gear set, and the second annular transmission member is part of, or rotationally connected to, a planetary carrier of the second planetary gear set. This layout becomes specifically strong and compact.

In one example embodiment, the transmission arrangement comprises first and second coaxial transmission shafts, a sun gear of the first planetary gear set is rotationally secured on the first transmission shaft, and a sun gear of the second planetary gear set is rotationally secured on the second transmission shaft.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Figure 1:
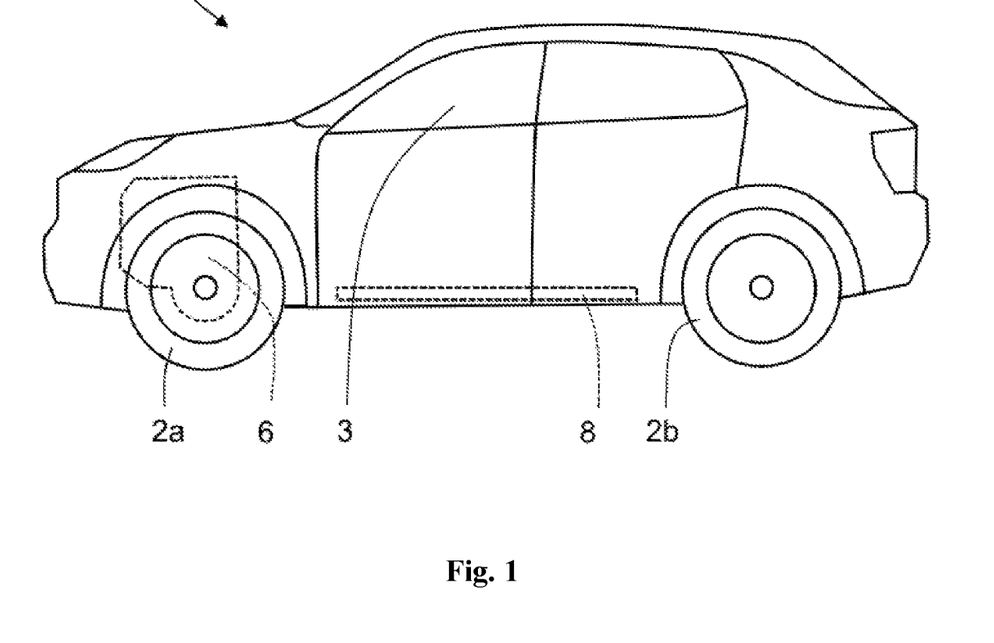
FIG. 1 is a side view of a vehicle that may have the transmission arrangement implemented therein.

Referring now to FIG. 1, there is depicted a side-view of a vehicle 1, in particular a passenger car or automobile, having a front wheel 2a, a rear wheel 2b, and a passenger compartment 3. In the example embodiment showed in FIG. 1, the car has a hybrid electric powertrain 6 for front wheel drive, wherein the powertrain 6 comprises a combustion engine connected to a transmission with one or more integrated electrical propulsion motors. A high-voltage propulsion battery pack 8 for driving the one or more electrical motors may for example be provided integrated into the floor of the car.

Figure 2:
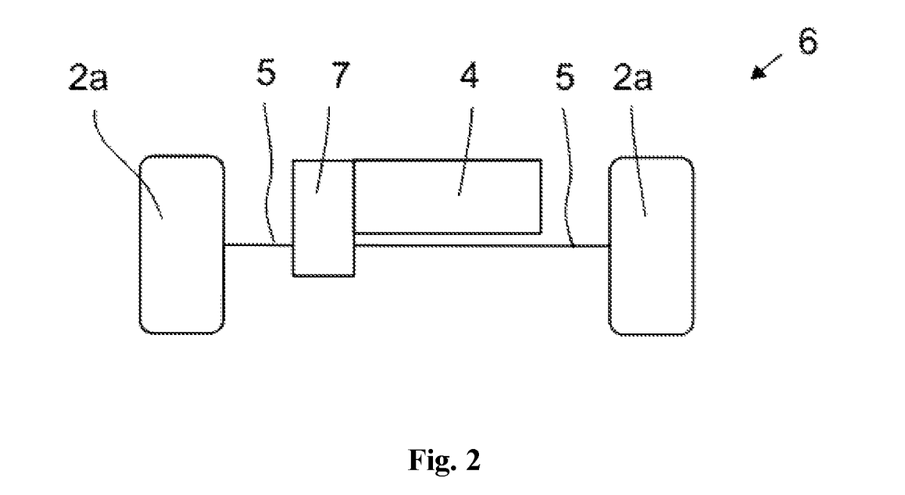
FIG. 2 is a schematic view of a powertrain of that may include the transmission arrangement.

FIG. 2 schematically shows a top-view of the powertrain 6 of the vehicle of FIG. 1 having the combustion engine 4 connected to the transmission 7, and drive shafts 5 for transferring rotational torque from a transmission output shaft to the driving front wheels 2a.

The powertrain 6 of the car schematically illustrated in FIG. 1 and FIG. 2 merely illustrates one example embodiment of a powertrain transmission in which a transmission arrangement according to the present disclosure may be implemented. In other words, the transmission arrangement according to the present disclosure may be implemented in many alternative and different types of transmissions for enabling a variable gear ratio between a transmission torque input shaft and torque output shaft. For example, the transmission arrangement according to the present disclosure may alternatively be implemented in transmissions for pure combustion driven vehicles or pure electric driven vehicles, in combination with front wheel drive, rear wheel drive or all-wheel drive.

Figure 3:
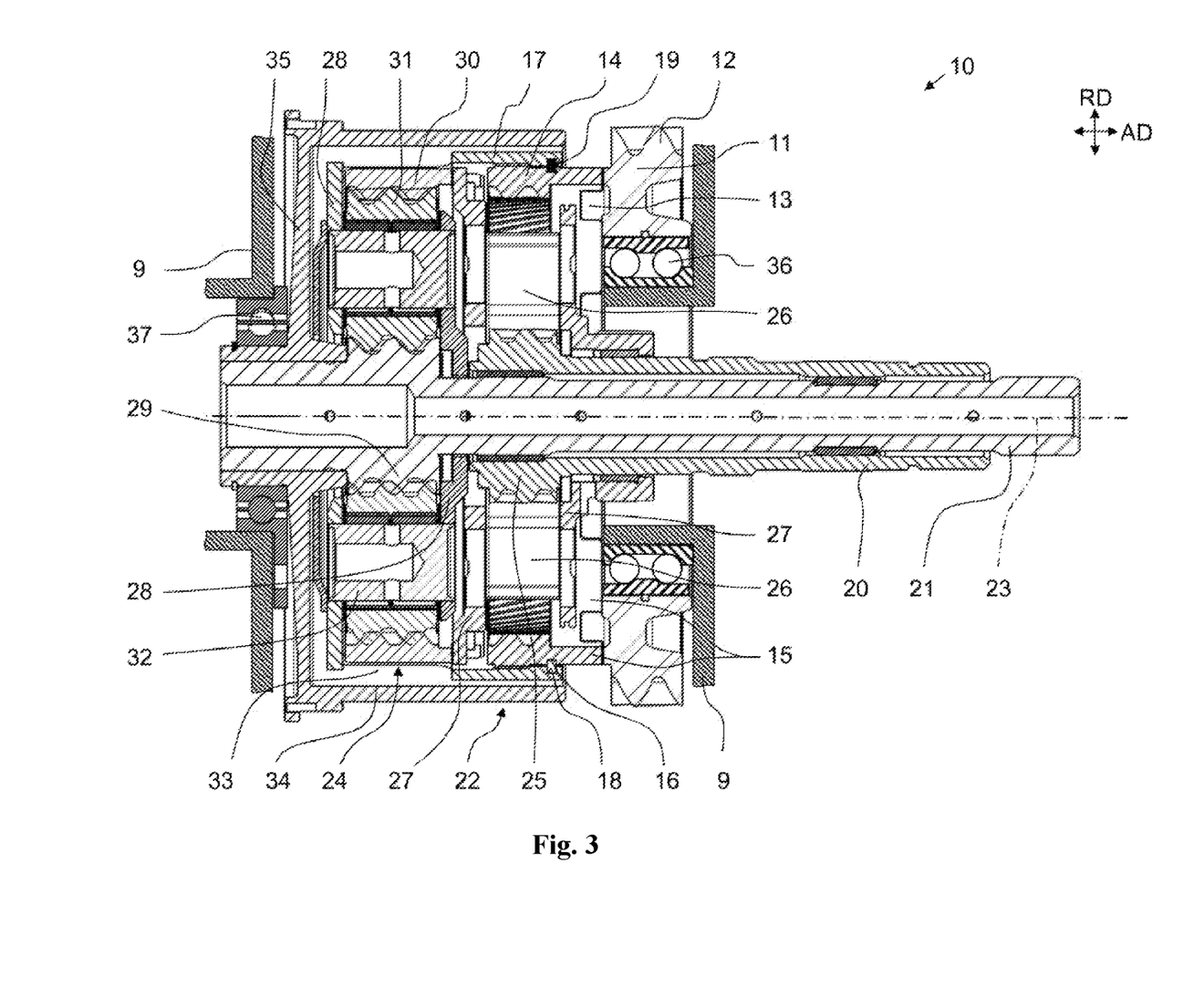
FIG. 3 is a cross-sectional view of an example embodiment of the transmission arrangement.

FIG. 3 shows a schematic cross-sectional view of an example embodiment of a transmission arrangement 10 according to the disclosure, which transmission arrangement 10 is configured to be located in transmission housing 9 of the transmission 7.

The transmission arrangement 10 has an axial direction AD and a radial direction RD and comprises a rotatable gear wheel 11 having radially outer helical or spur gear teeth 12 configured for meshing engagement with a further gear member (not showed), and axially protruding engagement members 13.

The transmission arrangement 10 further has a first annular transmission member 14 arranged next to the gear wheel 11 and having corresponding axially protruding engagement members 15 in torque transmission engagement with the engagement members 13 of the gear wheel 11, and an annular groove 16 provided in a radially facing surface.

The transmission arrangement 10 additionally has a second annular transmission member 17 being in torque transmission engagement with the first annular transmission 14 member and having an annular groove 18 provided in a radially facing surface and arranged radially overlapping with the annular groove 16 of the first annular transmission member 14 such that said annular grooves 16, 18 jointly define an annular space, and a locking member 19 located within said annular space for axial locking of the first and second annular transmission members 14, 17 relative to each other.

This design enables a strong, compact and lightweight torque connection between three individual components of the transmission. In particular, the axially protruding engagement 13 of the gear wheel 11 and the corresponding axially protruding engagement members 15 of the first transmission member 14 provides a very robust and compact torque connection.

In fact, the axially protruding engagement members 13 may be designed as dog teeth, and the corresponding axially protruding engagement members may be designed as corresponding dog teeth.

Moreover, the disclosed transmission arrangement enables relatively simply and fast assembly because the torque connection between the rotatable gear wheel 11 and the first annular transmission member 14 by means of axially protruding engagement members 13 interacting with corresponding axially protruding engagement members 15 is accomplished by mere axial relative displacement of the gear wheel 11 and first transmission member 14, and insertion of a single locking member 19 into the annular space provides axial relative locking of the first and second transmission members 14, 17.

Furthermore, the installation of the locking member 19 into the annular space, which is defined by the two annular grooves 16, 18 that are facing each other, the locking member 19 can be completely embedded into the first and second transmission members 14, 17 and thereby enabling a very compact design.

In the example embodiment of FIG. 3, the annular groove 16 of the first annular transmission member 14 is provided in a radially outward facing surface of the first annular transmission member 14, and the annular groove 18 of the second annular transmission member 17 is provided in a radially inward facing surface of the second annular transmission member 17.

The transmission arrangement 10 according to the example embodiment shown of FIG. 3 is implemented in a portion of the transmission configured for torque input via dual input shaft arrangement and torque output via the gear wheel 11.

The dual input shaft arrangement comprises a first transmission shaft 20 and a second transmission shaft 21, wherein the second transmission shaft 21 is coaxial with and located within the first transmission shaft 20. One or more power sources, such as combustion engine and/or electrical motors are typically connected to the dual input shaft arrangement via a clutch arrangement (not showed).

The transmission arrangement 10 comprises a first planetary gear set 22 arranged side-by-side with and having common rotational axis 23 as the gear wheel 11, and the first annular transmission member 14 is a ring gear of the first planetary gear set 22.

The first planetary gear set 22 additionally includes a sun gear 25, a plurality of planet gear 26 that are in constant meshing engagement with the sun gear 25 and ring gear 14, and a planetary carrier 27 that carries the planet gears 26 and is rotationally mounted around the common rotational axis 23. The sun gear 25 of the first planetary gear set 22 is rotationally secured on or to the first transmission shaft 20.

Moreover, the transmission arrangement 10 comprises a second planetary gear set 24 arranged side-by-side with and having common rotational axis 23 as the first planetary gear set 22, and the second annular transmission member 17 is part of, or rotationally connected to, a planetary carrier 28 of the second planetary gear set 24.

Figure 4:
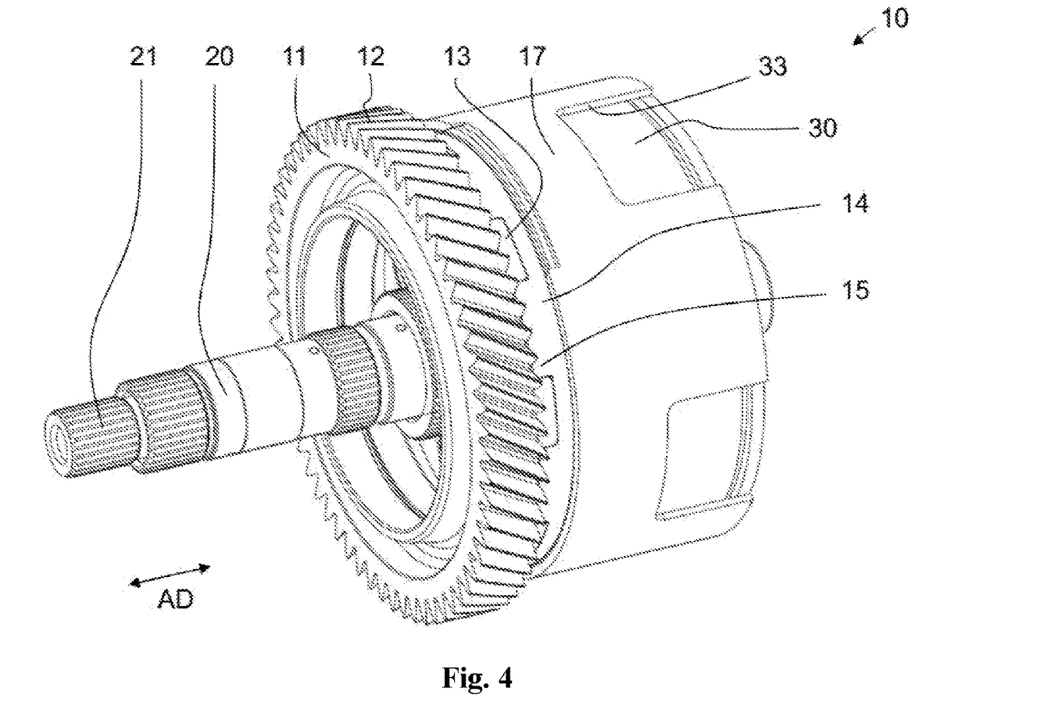
FIG. 4 is a 3D-view of an example embodiment of the transmission arrangement.

The rotational connection between the second annular transmission member 17 and the planetary carrier 28 of the second planetary gear set 24 is slightly difficult to verify in FIG. 3 due to windows 33 located in the second annular transmission member 17, as will be described more with reference to FIG. 4.

The second planetary gear set 24 additionally includes a sun gear 29, a ring gear 30, and a plurality of planet gear 31 that are in constant meshing engagement with the sun gear 29 and ring gear 30. The planetary carrier 28 carries the planet gears 31 via a plurality of shafts 32 and is rotationally mounted around the common rotational axis 23. Moreover, the sun gear 29 of the second planetary gear set 24 is rotationally secured on or to the second transmission shaft 21.

In the example embodiment of FIG. 3, the planetary carrier 27 of the first planetary gear set 22 is rotationally secured to the ring gear 30 of the second planetary gear set 24.

A rotor of an electrical motor (not showed) may additionally be rotationally connected to the second transmission shaft 21 via a hub 34 and a flange 35. The hub 24 may thanks to the compact design of the transmission arrangement 10 be mounted very close to the second transmission member 17 in a radial direction RD.

Clutch brakes (not showed) may be connected to the planetary carrier of the first planetary gear set 22 and first transmission shaft 20 for enabling a desired gear ratio between the dual input shaft arrangement and the gear wheel 11.

A first bearing arrangement 36 is provided between the housing 9 and interior surface of the gear wheel 11 for rotational support of the gear wheel 11. This bearing arrangement 36 also provides axial support of the gear wheel 11 for avoiding the gear wheel 11 of becoming disengaged with the first transmission member 14.

The hub 34 is rotationally supported by the housing 9 via a second bearing arrangement 37.

The transmission arrangement 10 according to the disclosure is further described with reference to FIG. 4, which shows a 3D-view of an example embodiment of the transmission part showed in FIG. 3, including the first and second transmission shafts 20, 21, the gear wheel 11 with helical external teeth 12 and its axially protruding engagement members 13, the first transmission member 14 with its axially protruding corresponding engagement members 15, and the second transmission member 17 with windows 33 distributed around the periphery of the second transmission member 17. The ring gear 30 of the second planetary gear set 24 is visible through the windows 33.

Figure 5:
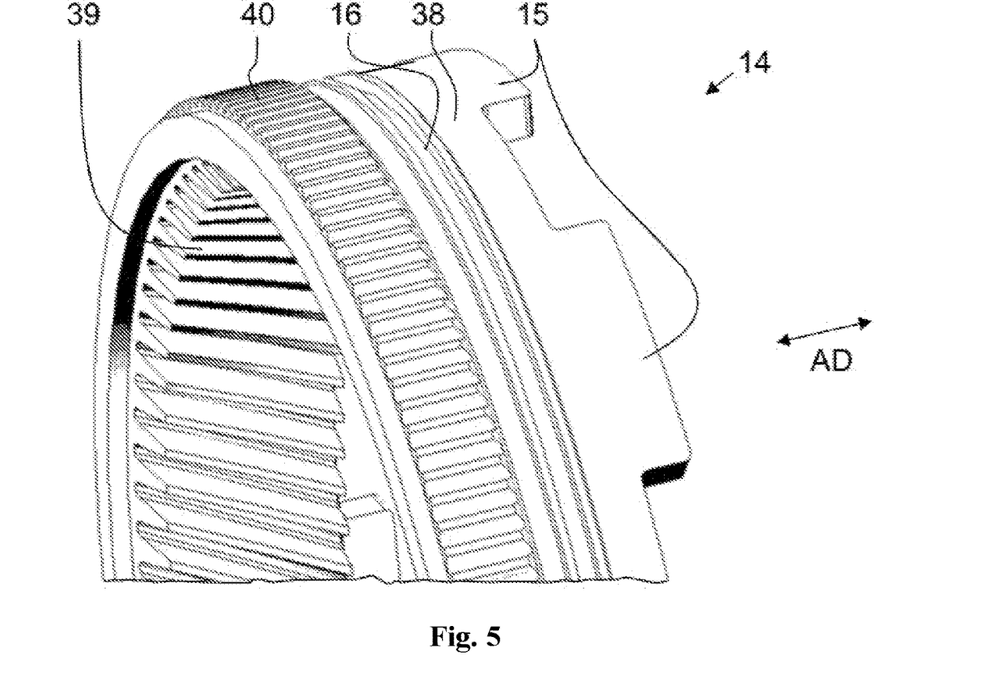
FIG. 5 shows a 3D-view of an example embodiment of the first transmission member.

FIG. 5 shows a 3D-view of a portion of an example embodiment of the first transmission member 14, including the axially protruding corresponding engagement members 15, the annular groove 16 provided in the radially outward facing surface 38, and inner toothing 39 for meshing engagement with the plurality of planet gears 26 of the first planetary gear set 22.

The first transmission member 14 is also provided with axially extending splines 40 located on a radially outwards facing surface of the first transmission member 14. The axially extending splines 40 are configured for being in torque transmission engagement with corresponding axially extending splines of the second annular transmission member 17, such that relative rotational locking of the first and second transmission members 14, 17 is provided.

Figure 6:
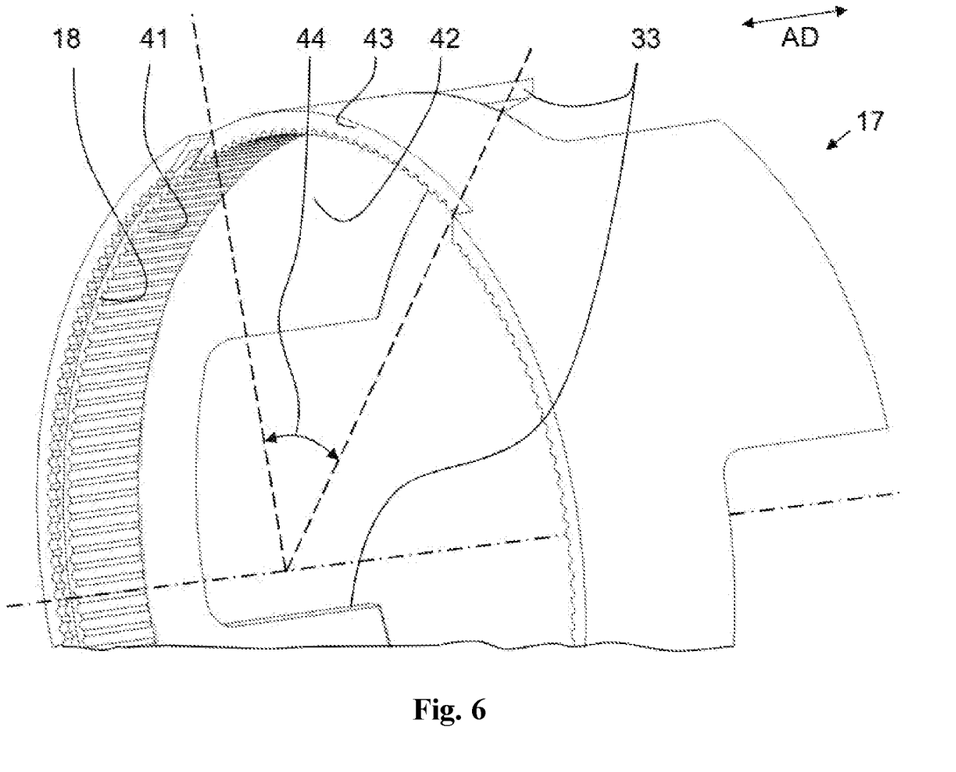
FIG. 6 shows a 3D-view of an example embodiment of the second transmission member.

FIG. 6 shows a 3D-view of an example embodiment of a portion of the second transmission member 17, including said corresponding axially extending splines 41, which are configured for being in torque transmission engagement with the axially extending splines 40 of the first annular transmission member 14.

The second transmission member 17 shown in FIG. 6 additionally comprises the annular groove 18 provided in a radially inward facing surface 42 of the second annular transmission member 17, as well as the aforementioned windows 33. The axial end of the second transmission member 17 located on opposite to the annular groove 18 may for example be configured to be rotationally connected with the planetary carrier 28 of the second planetary gear set 24, as described with reference to FIG. 3. However, the second annular transmission member 17 may alternatively be connected to another part of the transmission, such as for example the ring gear 31 of the second planetary gear set 24, or any other part of the transmission.

A recess 43 in an axial end surface of the second annular transmission member 17 associated with the annular groove 18 is also schematically illustrated in FIG. 6, which recess 43 enables access to said annular space when the annular grooves 16, 18 of the first and second transmission members 14, 17 are facing each other. Specifically, the recess is configured to span over a certain circular section, such as about 10-90 degrees as illustrated by angle 44 in FIG. 6. Moreover, the recess is configured to extend axially inwards from an end surface until the complete width of the annular groove 18 is exposed, such that access to the annular groove 18 is accomplished also when the first and second transmission members 14, 17 are properly mounted.

Figure 7A:
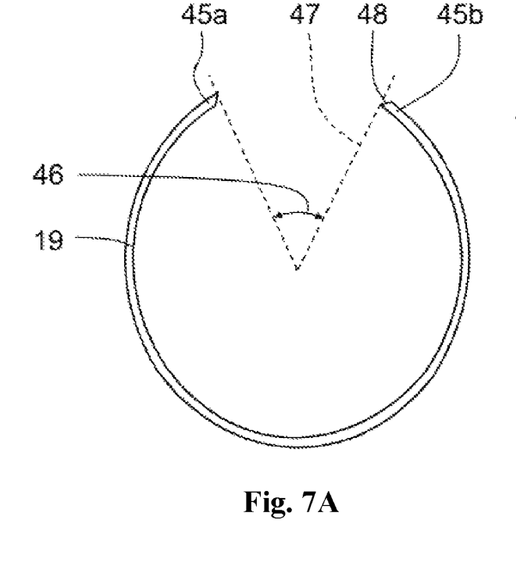
FIG. 7A shows a side view of an example embodiment of the locking member.

FIG. 7A schematically shows an example embodiment of the locking member 19 in a natural state. The locking member 19 has an annular or arc-shaped form in a natural state. Specifically, the locking member is a split ring with two free ends 45a, 45b. In a natural state, an opening angle 46 between the free ends 45a, 45b may be about 20-90 degrees. The locking member 19 may for example be manufactured in a spring steel alloy.

Moreover, the locking member 19 may for example be designed to be free from radially extending gripping portions. Such gripping portions, which are frequently used for simplified handling of locking rings and snap-rings in general and may extend radially inwards or outwards, would in the present case negatively interfere with the interior surface of the annular grooves 16, 18 of the first and second transmission members 14, 17, and possibly completely obstruct insertion of the locking member 19 into the annular space. Therefore, the locking member 19 according to the present disclosure may preferably be relatively smooth and without radial projections or radially extending gripping portions for enabling a smooth and simple insertion of the locking member 19 into the annular space.

Figure 7B:
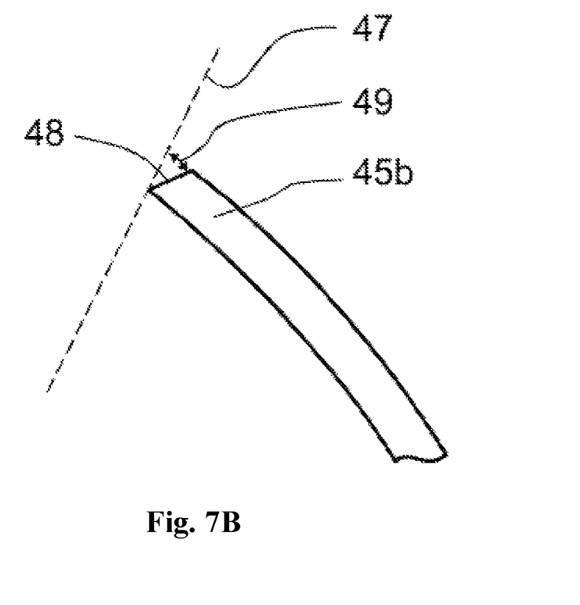
FIG. 7B shows a magnification of a portion of FIG. 7A.

For the same reason, the at least one free end 45a, 45b may have an inclined end surface 48 with respect to a perpendicular plane 47 of the free end, such that insertion of the locking member 19 into the annular space is simplified. This is schematically illustrated in FIG. 7B, which shows a magnification of free end 45b, the perpendicular plane 47 and the end surface 48, wherein the end surface 48 defines an acute angle 49 with the perpendicular plane 47 of the free end 45b, which angle is facing radially outwards. In other words, the end surface 48 forms a wedge that simplifies insertion of the free end 45b into the annular space, because the wedge-shaped free end 45b is automatically steered into annular space also when the free end 45b is not perfectly aligned with the annular space.

Figure 8:
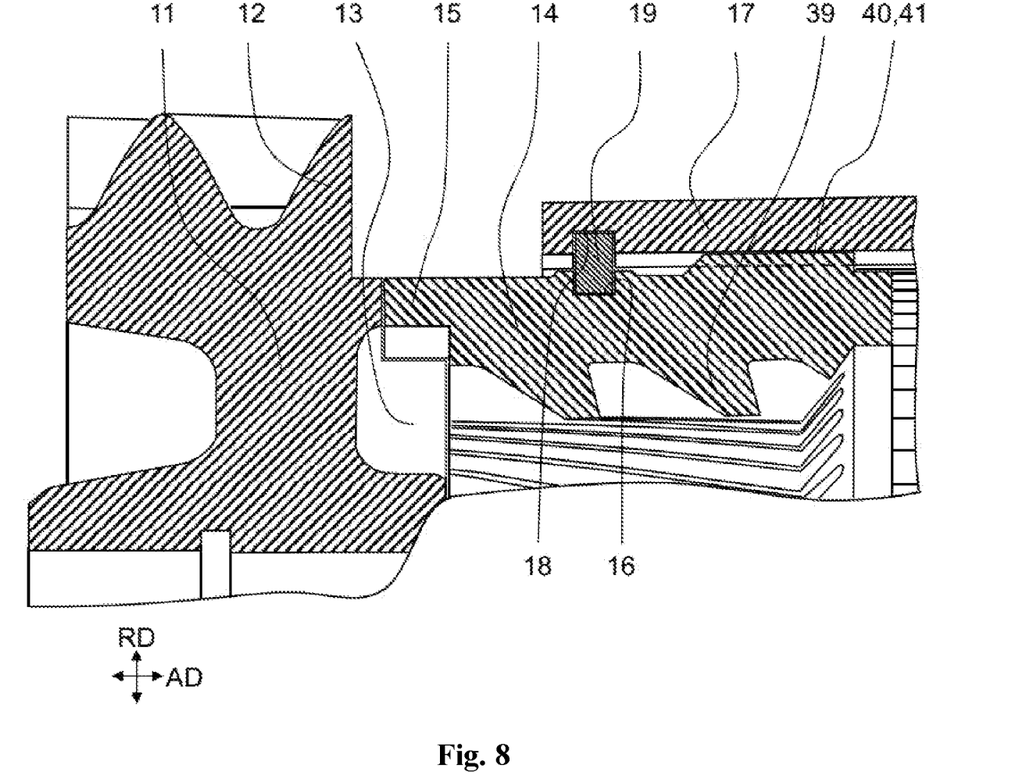
FIG. 8 shows a cross-sectional view of an example embodiment of the transmission arrangement.

FIG. 8 schematically shows a cross-section of an example embodiment of the transmission arrangement according to the disclosure comprising the gear wheel 11, the first and second transmission members 14, 17 and the locking member 19. Specifically, FIG. 8 clearly illustrates the torque engagement between the axially protruding engagement 13 of the gear wheel 11 and the corresponding axially protruding engagement members 15 of the first transmission member 14.

Moreover, FIG. 8 also clearly shows the torque transmission engagement between the axially extending splines 40 of the first annular transmission member 14 and the corresponding axially extending splines 41 of the second annular transmission member 17. In addition, FIG. 8 clearly shows that annular groove 16 provided in a radially outwards facing surface of the first transmission member 14 is arranged radially overlapping with the annular groove 18 provided in a radially inwards facing surface of the second annular transmission member 17, such that said annular grooves 16, 18 jointly define an annular space that accommodates the locking member 19.

The locking member 19 unambiguously provides axial relative locking of the first and second transmission members 14, 17 in both axial directions AD. Moreover, FIG. 8 also shows that the locking member 19 is completely embedded into the first and second transmission members 14, 17, such that no part of the locking members 19 protrudes beyond a radial outer surface of the second transmission member 17 or beyond a radial inner surface of the second transmission member 17.

FIG. 8 further illustrates the compact and space-saving design that is obtained by the dog clutch torque connection between the gear wheel 11 and first transmission member 14, wherein the gear wheel 11 and first transmission member 14 can be located very close together in the axial direction AD, and in fact even in axial contact with each other.

Moreover, by placing the second annular transmission member 17 radially overlapping and outside of the first annular transmission member 14, the first transmission member 14 may be made very compact and small because the annular groove 16 and axial splines 40 are then provided in the radial outer surface while the radial inner surface is provided with the inner toothing 39 for meshing engagement with the plurality of planet gears 26 of the first planetary gear set 22. In other words, both the radial inner and outer surfaces of the first annular transmission member 14 are utilized, and also the axial surface for the corresponding axially protruding engagement members 15.

An axial tolerance between the locking member 19 and each of the annular grooves 16, 18 of the first and second annular transmission members 14, 17 may be in the range of 0.01-5 mm, specifically 0.05-1 mm, and more specifically 0.1-0.5 mm.

Moreover, a radial tolerance between the locking member 19 and radial surfaces of the annular grooves 16, 18 of the first and second annular transmission members 14, 17 may be in the range of 0.01-2 mm, and specifically 0.1-1 mm. Alternatively, a radial tolerance between the locking member 19 and radial surfaces of the annular grooves 16, 18 of the first and second annular transmission members 14, 17 may be less than 50%, specifically less than 25%, of a thickness of the locking member in the radial direction.

In other words, contrary to the functionality of a conventional snap-ring that typically may be merely radially expanded or contracted to unlock two coaxial and overlapping cylindrical parts, the locking member 19 and associated annular grooves 16, 18 according to the present disclosure are dimensioned and configured for preventing the possibility to radially expand or contract the locking member 19 for enabling axial relative motion between the first and second annular transmission members 14, 17. Instead, the radial tolerance or radial play of the locking member 19 is so small that it is virtually impossible to mutually disconnect the first and second annular transmission members 14, 17, unless the locking member 19 is first removed from the annular space defined by the annular grooves 16, 18.

In some example embodiments, the second annular transmission member 17 has a sleeve portion partly radially overlapping the first annular transmission member 14, wherein the annular groove 18 of the second annular transmission member 17 is provided in a radially facing surface of said sleeve portion.

Figure 9:
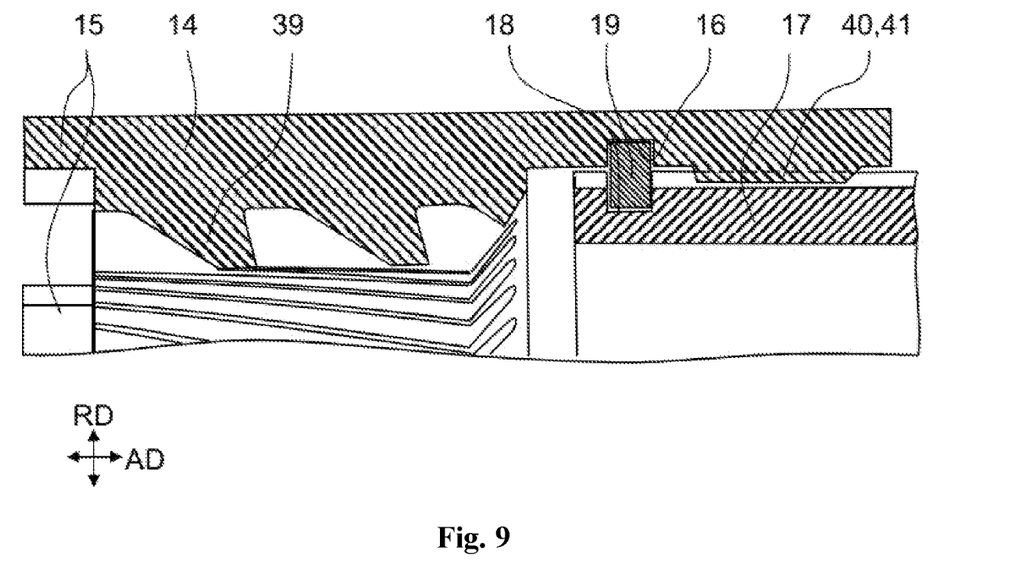
FIG. 9 shows a cross-sectional view of still an example embodiment of the transmission arrangement.

FIG. 9 shows an alternative embodiment of the transmission arrangement 10, in which the second annular transmission member 17 is located radially overlapping and inside of the first annular transmission member 14. This design typically may result in a less compact design of the transmission arrangement in the axial direction AD, but may nevertheless by advantageous for other reasons in certain designs. In such an arrangement, the annular groove 16 of the first transmission member 14 is provided in the radially inward facing surface of the first transmission member 14, and the annular groove 18 of the second transmission member 17 is provided in a radially outward facing surface of the second transmission member 17. Furthermore, the axially extending splines 40 are located on a radially inwards facing surface of the first transmission member 14, and the corresponding axially extending splines 41 are located on a radially outwards facing surface of the second transmission member 17.

The opening or recess for enabling access to said annular space is then typically provided in the second annular transmission member 17, because the locking member 19 is typically inserted from an outside of the transmission arrangement 10.

The connection to the gear wheel 11 is not changed compared with the embodiment described with reference to FIG. 8, and the gear wheel 11 is therefore not shown in the example embodiment of FIG. 9.

Figure 10:
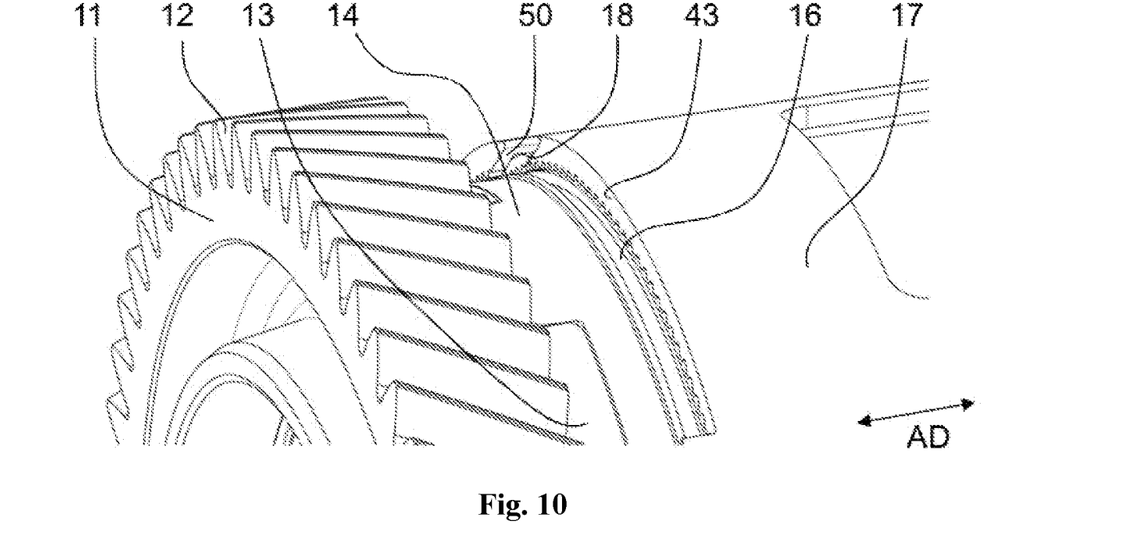
FIG. 10 shows a close-up 3D view of a recess giving access to the annular space.
Figure 11:
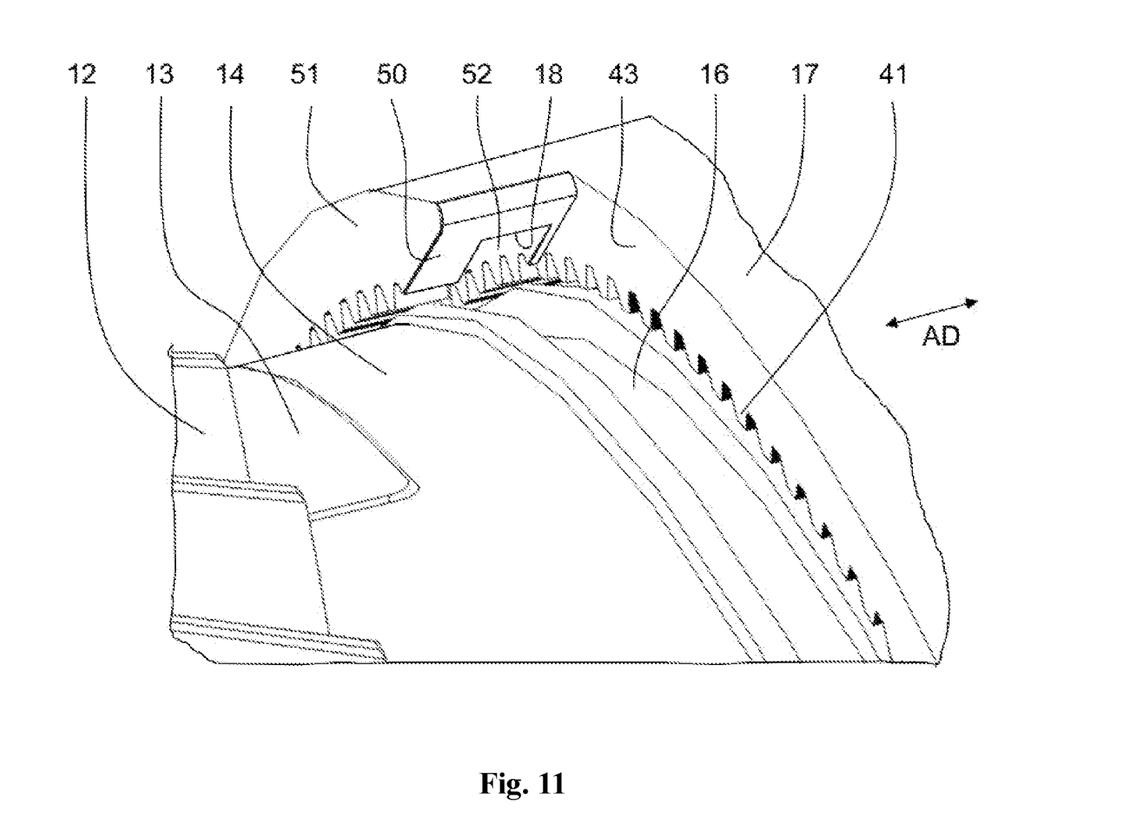
FIG. 11 shows an even more close-up view of said recess and opening to the annular space.

FIG. 10 shows a first magnification of a transmission arrangement 10 having the second annular transmission member 17 located radially overlapping and outside of the first annular transmission member 14 and specifically focused on the access to the annular space, and FIG. 11 shows an even larger magnification of said access to the annular space. By providing a recess 43 in an axial end surface 51 of the second transmission member 17, access to annular space jointly defined by the annular grooves 16, 18 of the first and second transmission members 14, 17 is provided.

As illustrated in FIGS. 10 and 11, the second annular transmission member may according to one example embodiment have a conical surface 50 associated with said recess 43, which conical surface 50 converges towards the annular space for enabling simplified insertion of the locking member 19 into the annular space. In other words, the conical surface in inclined with respect to plane that is tangential with the outer circumferential surface of the second transmission member 17 at the location of said conical surface 50.

As a result, the free end 45*a*, 45*b* of the locking member 19 that is pushed towards an access opening 52 of the annular space is guided towards said access opening of the annular space by means of the conical surface 50 if the free end 45*a*, 45*b* is slightly offset from the access opening for any reason.

To summarize, the first and second annular transmission members 14, 17 are arranged at least partially radially overlapping, such that one of the first and second annular transmission members 14, 17 is located outside the other of the first and second annular transmission members 14, 17, and wherein a recess 43 is located in the radially outer member of said first and second annular transmission members 14, 17, wherein said recess 43 is located in an axial end surface 51 thereof, which recess 43 extends from said axial end surface 51 to a remote axial side of the annular groove of the outer transmission member 14, 17, as seen in the axial direction AD, such as to provide access to the annular space.

The locking member 19 is configured to be inserted into the annular space by first orienting a free end 45*a*, 45*b* of the locking member 19 tangentially with the annular space in a region of the recess or opening 43 and inserting the free end 45*a*, 45*b* of the locking member 19 into an access opening 52 of the annular space, and subsequently performing a relative rotation between the locking member 19 and the first and second annular transmission members 14, 17 for sliding insertion of the locking member 19 into the annular space.

In other words, the locking member 19 is configured to be inserted into the annular space first after the annular space jointly defined by the annular grooves 16, 18 of the first and second transmission members 14, 17 has been formed. Furthermore, said insertion of the locking member 19 into the annular space does not include any motion of the locking member 19 in the axial direction AD, but merely motion in a plane perpendicular to the axial direction AD.

A curved natural state, in particular a circular shape, of the locking member 19 may generally simplify insertion of the locking member 19 into the annular space.

Figure 12:
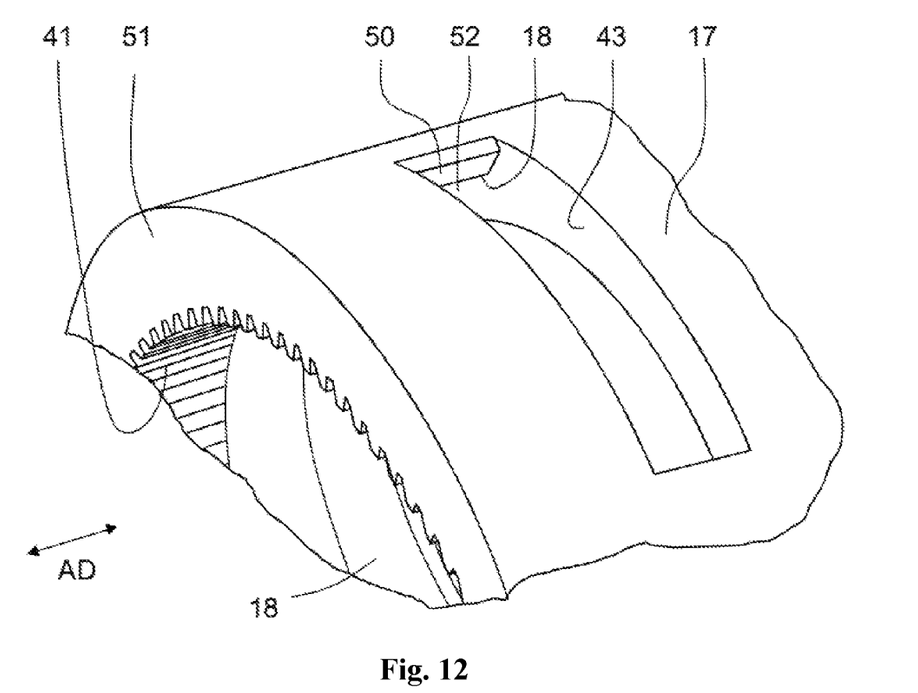
FIG. 12 shows a close-up 3D view of an opening giving access to the annular space.

A further alternative embodiment of the second transmission member 17 is schematically illustrated in FIG. 12, which shows a 3D view of a portion of said second transmission member 17 having axially extending internal splines 41 and an internal annular groove 18. This embodiment differs from the previously shown embodiments in that access to the annular space is provided by an opening 43 provided in the second annular transmission member 17.

The opening 43 is located radially overlapping with the annular groove 18 of the second transmission member 17, which annular groove 18 is provided in a radially inwardly facing surface of the second transmission member 17. The opening is offset from the axial end surface 51 of the second transmission member 17.

Moreover, a width of the opening 43 in the axial direction AD must be larger than the corresponding width of the locking member 19 for enabling the insertion of the locking member 19 into the annular space through the opening 43. The width of the opening 43 in the axial direction AD may for example be equal to the width of the annular groove 18 in the axial direction AD, or about 0.1-5 mm larger. In addition, the opening may have conical surfaces converging towards the annular space for simplifying insertion of the locking member 19.

To conclude, the first and second annular transmission members 14, 17 are arranged at least partially radially overlapping, such that one of the first and second annular transmission members 14, 17 is located outside the other of the first and second annular transmission members 14, 17, and wherein an opening 43 is located in the radially outer member of said first and second annular transmission members 14, 17, and wherein said opening 43 extends through the outer transmission member in the radial direction and exiting within the annular groove 16, 18 of the outer transmission member 14, 17, such as to provide access to the annular space.

As a result, the opening 43 may thus alternatively be provided in the first transmission member 14 if this is arranged radially overlapping and on the outer side of the second transmission member 17, as described with reference to FIG. 9 above.

Figure 13:
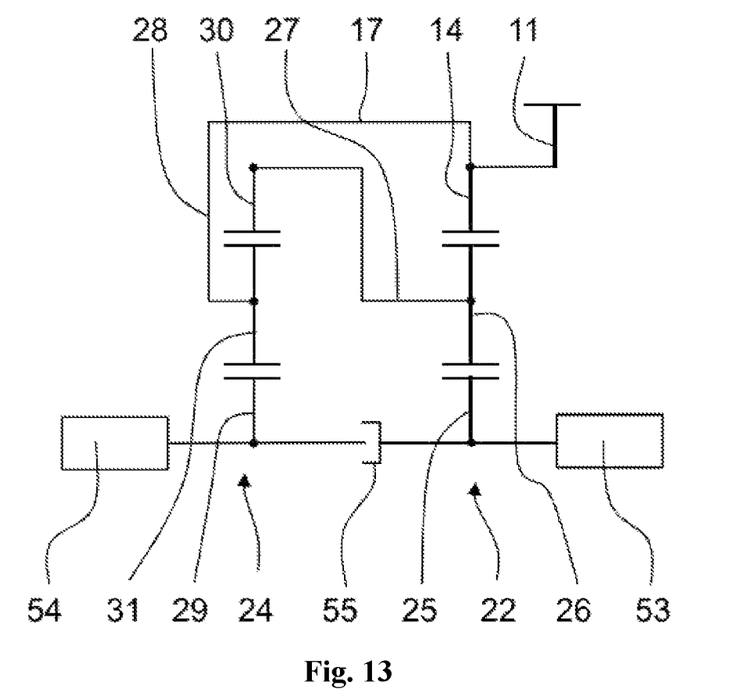
FIG. 13 shows an example transmission layout that may include the transmission arrangement.

The transmission arrangement may be implemented in many different types of transmission layouts and configuration, and merely as an example, FIG. 13 schematically shows one example embodiment of a transmission in which the transmission arrangement according to the disclosure may be implemented. The transmission of FIG. 13 includes a first planetary gear set 22 having a sun gear 25 rotationally connected to a first motor 53, a plurality of planet gear 26 carried by a planetary carrier 28, and a ring gear 14 rotationally connected to the output gear wheel 11. The transmission further includes a second planetary gear set 24 having a sun gear 29 rotationally connected to a second motor 54, a plurality of planet gear 31 carried by a planetary carrier 17 that is connected to the ring gear 14 of the first planetary gear set 22, and a ring gear 30 rotationally connected to the planetary carrier 28 of the first planetary gear set 22. A clutch 55 may additionally be provided for selective rotational connection of the sun gears of the first and second planetary gear sets 22, 24. In this transmission layout the first transmission member corresponds to the ring gear 14 of the first planetary gear set 22 and the second transmission member is part of, or connected to, the planetary carrier 17 of the second planetary gear set 24.

Figure 14:
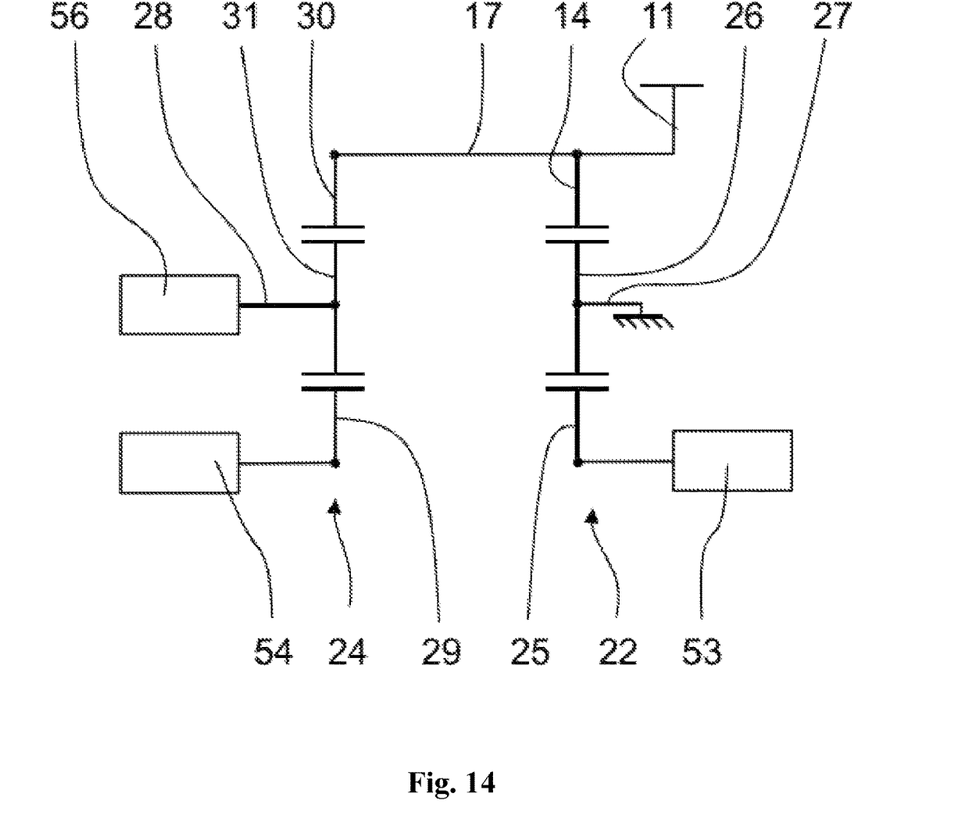
FIG. 14 shows a further example transmission layout that may include the transmission arrangement.

Merely as a further example, FIG. 14 schematically shows still one example embodiment of a transmission in which the transmission arrangement according to the disclosure may be implemented. The transmission of FIG. 14 includes a first planetary gear set 22 having a sun gear 25 rotationally connected to a first motor 53, a plurality of planet gear 26 carried by a planetary carrier 27, and a ring gear 14 rotationally connected to the output gear wheel 11. The transmission further includes a second planetary gear set 24 having a sun gear 29 rotationally connected to a second motor 54, a plurality of planet gear 31 carried by a planetary carrier 28 and a ring gear 30 rotationally connected to the ring gear 14 of the first planetary gear set 22. A third motor 56 may be provided driving connected with the planetary carrier 28 of the second planetary gear set 24. Moreover, the planetary carrier 27 of the first planetary gear set 22 may be stationary. In this transmission layout the first transmission member corresponds to the ring gear 14 of the first planetary gear set 22 and the second transmission member 17 is part of, or connected to, the ring gear 30 of the second planetary gear set 24.

Many other alternative transmission layouts are possible and the scope of the disclosure is defined by the appended claims.

Figure 15:
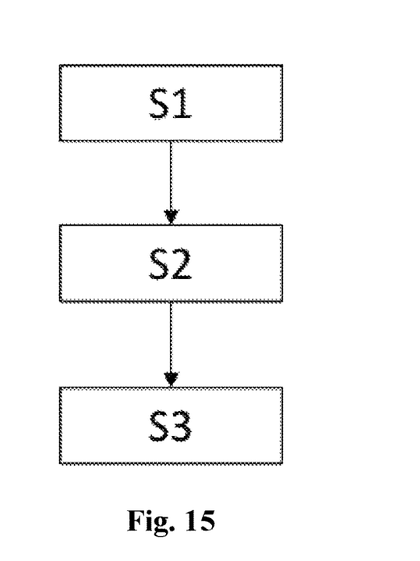
FIG. 15 shows a flowchart describing the method for assembling the transmission arrangement.

A method for assembling a transmission arrangement according to the disclosure is hereinafter described with reference to FIG. 15. The method comprises a first step S1 of assembling first and second transmission members 14, 17 in torque transmission engagement with one another and arranging an annular groove 16 provided in a radially facing surface of the first annular transmission member 14 radially overlapping with an annular groove 18 provided in a radially facing surface of the second annular transmission member 17, such that said annular grooves 16, 18 jointly define an annular space.

The method further comprises a second step S2 of inserting a free end 45a, 45b of the locking member 19 into an opening or recess 43 of the first or second annular transmission members 14, 17, and subsequently performing a relative rotation between the locking member 19 and the first and second annular transmission members 14, 17 for sliding insertion of the locking member 19 into the annular space, such as to axially lock the first annular transmission member 14 to the second annular transmission member 17.

The method finally comprises a third step S3 of assembling the first annular transmission member 14 with a rotatable gear wheel 11 by axial relative displacement between the first annular transmission member 14 and the gear wheel 11, such that axially protruding engagement members 13 of the gear wheel 11 becomes engaged with corresponding axially protruding engagement members 15 of the first annular transmission member 14.

Although the disclosure has been described in relation to specific combinations of components, it should be readily appreciated that the components may be combined in other configurations as well which is clear for the skilled person when studying the present application. For example, the first transmission member may be, or be connected to, a ring gear, a planetary carrier or a sun gear of a first planetary gear set, and the second transmission member may be, or be connected to, a ring gear, a planetary carrier or a sun gear of a second planetary gear set. In fact, both the first and second transmission members may be, or be connected to, any type of rotating gear or clutch members of a transmission arrangement.

Thus, the above description of the example embodiments of the present disclosure and the accompanying drawings are to be regarded as a non-limiting example of the disclosure and the scope of protection is defined by the appended claims. Any reference sign in the claims should not be construed as limiting the scope. Furthermore, with respect to the method described by the flowchart of FIG. 15, it should be appreciated that one or more operations may be added to the method steps discussed, and that the operations may be performed in another order.

What is claimed is:

1. A transmission arrangement for a vehicle, wherein the transmission arrangement has an axial direction and a radial direction and comprising:
    a rotatable gear wheel having radially outer teeth configured for meshing engagement with a further gear member, and axially protruding engagement members,
    a first annular transmission member arranged next to the gear wheel and having corresponding axially protruding engagement members in torque transmission engagement with the engagement members of the gear wheel, and an annular groove provided in a radially facing surface,
    a second annular transmission member being in torque transmission engagement with the first annular transmission member and having an annular groove provided in a radially facing surface and arranged radially overlapping with the annular groove of the first annular transmission member such that said annular grooves jointly define an annular space, and
    a locking member located within said annular space for axial locking of the first and second annular transmission members relative to each other,
    wherein an opening or recess is provided in the first or second annular transmission member for enabling access to said annular space.

2. The transmission arrangement according to claim 1, wherein the first annular transmission member has axially extending splines in torque transmission engagement with corresponding axially extending splines of the second annular transmission member.

3. The transmission arrangement according to claim 1, wherein the axially protruding engagement members are dog teeth, and the corresponding axially protruding engagement members are corresponding dog teeth.

4. The transmission arrangement according to claim 1, wherein the annular groove of the first annular transmission member is provided in a radially outward facing surface, and the annular groove of the second annular transmission member is provided in a radially inward facing surface.

5. The transmission arrangement according to claim 1, wherein the first or second annular transmission member has a conical surface associated with said opening or recess and converging towards the annular space for enabling simplified insertion of the locking member into the annular space.

6. The transmission arrangement according to claim 1, wherein the locking member has an annular or arc-shaped form in a natural state.

7. The transmission arrangement according to claim 1, wherein the locking member is configured to be inserted into the annular space by first orienting a free end of the locking member tangentially with the annular space in a region of the recess or opening and inserting a free end of the locking member into an access opening of the annular space, and subsequently performing a relative rotation between the locking member and the first and second annular transmission members for sliding insertion of the locking member into the annular space.

8. The transmission arrangement according to claim 1, wherein the first and second annular transmission members are arranged at least partially radially overlapping, such that one of the first and second annular transmission members is located outside the other of the first and second annular transmission members, and wherein the opening or recess is located in the radially outer member of said first and second annular transmission members, and wherein said radially outer transmission member has:
 a recess in an axial end surface thereof, which recess extends from said axial end surface to a remote axial side of the annular groove of the outer transmission member, as seen in the axial direction, such as to provide access to the annular space.

9. The transmission arrangement according to claim 1, wherein an axial tolerance between the locking member and each of the annular groove of the first and second annular transmission members is in the range of 0.01 mm to 5 mm.

10. The transmission arrangement according to claim 1, wherein the second annular transmission member has a sleeve portion partly radially overlapping the first annular transmission member, and the annular groove of the second annular transmission member is provided in a radially facing surface of the sleeve portion.

11. The transmission arrangement according to claim 1, wherein the transmission arrangement comprises a first planetary gear set arranged side-by-side with and having common rotational axis as the gear wheel, and the first annular transmission member is a ring gear of the first planetary gear set.

12. The transmission arrangement according to claim 11, wherein the transmission arrangement comprises a second planetary gear set arranged side-by-side with and having common rotational axis as the first planetary gear set, and the second annular transmission member is part of, or rotationally connected to, a planetary carrier of the second planetary gear set.

13. The transmission arrangement according to claim 12, wherein the transmission arrangement comprises first and second coaxial transmission shafts, a sun gear of the first planetary gear set is rotationally secured on the first transmission shaft, and a sun gear of the second planetary gear set is rotationally secured on the second transmission shaft.

14. The transmission arrangement according to claim 1, wherein the annular groove of the first annular transmission member is provided in a radially inward facing surface, and the annular groove of the second annular transmission member is provided in a radially outward facing surface.

15. The transmission arrangement according to claim 1, wherein the first and second annular transmission members are arranged at least partially radially overlapping, such that one of the first and second annular transmission members is located outside the other of the first and second annular transmission members, and wherein the opening or recess is located in the radially outer member of said first and second annular transmission members, and wherein said radially outer transmission member has:
 an opening extending through the outer transmission member in the radial direction and exiting within the annular groove of the outer transmission member, such as to provide access to the annular space.

16. A method for assembling a transmission arrangement for a vehicle, the method comprising:
 assembling first and second transmission members in torque transmission engagement with one another and arranging an annular groove provided in a radially facing surface of the first annular transmission member radially overlapping with an annular groove provided in a radially facing surface of the second annular transmission member, such that said annular grooves jointly define an annular space,
 inserting a free end of a locking member into an opening or recess of the first or second annular transmission members, and subsequently performing a relative rotation between the locking member and the first and second annular transmission members for sliding insertion of the locking member into the annular space, such as to axially lock the first annular transmission member to the second annular transmission member, and
 assembling the first annular transmission member with a rotatable gear wheel by axial relative displacement between the first annular transmission member and the gear wheel, such that axially protruding engagement members of the gear wheel becomes engaged with corresponding axially protruding engagement members of the first annular transmission member.

* * * * *